United States Patent [19]

Clark et al.

[11] Patent Number: 4,731,501

[45] Date of Patent: Mar. 15, 1988

[54] ENTRANCE TERMINALS FOR TELECOMMUNICATIONS CABLE

[75] Inventors: Gordon P. F. Clark, Beaconsfield; Richard Benoit, Longueuil; Zbigniew T. Karwowski, Dollard Des Ormeaux, all of Canada

[73] Assignee: Northern Telecom Limited, Montreal, Canada

[21] Appl. No.: 795,558

[22] Filed: Nov. 6, 1985

[30] Foreign Application Priority Data

Jun. 19, 1985 [CA] Canada .................................. 484543

[51] Int. Cl.⁴ .............................................. H02G 3/22
[52] U.S. Cl. .................................. 174/65 R; 174/59; 174/153 G; 277/212 FB; 361/356; 439/718
[58] Field of Search .................... 174/65 R, 65 G, 59, 174/60, 66, 67, 48, 152 G, 153 G; 361/334, 340, 356, 428, 393, 394; 339/198 J, 36, 39; 277/212 FB, 200; 439/718

[56] References Cited

U.S. PATENT DOCUMENTS

| | | | |
|---|---|---|---|
| 256,866 | 4/1882 | Teal | 174/39 |
| 1,862,811 | 6/1932 | Strong | 361/356 X |
| 2,797,955 | 7/1957 | Wilfert | 174/153 G X |
| 2,799,528 | 7/1957 | Wilfert | 174/153 G X |
| 4,516,818 | 5/1985 | Johnston et al. | 339/36 |

FOREIGN PATENT DOCUMENTS 2629426  1/1978  Fed. Rep. of Germany ... 174/65 G

Primary Examiner—A. T. Grimley
Assistant Examiner—D. A. Tone
Attorney, Agent, or Firm—R. J. Austin

[57] ABSTRACT

Entrance terminal housing having walls sealed together at their junctions and defining a chamber opening. A removable cover is provided for the opening and a seal between walls and cover. In preferred arrangements, removable covers isolate terminals within the housing from other terminals and also isolate the terminals from the rest of the chamber. A fire resistant conductor sleeve is provided of flexible material and is of radially expansible and collapsible tapered tubular form for sealing around a range of numbers of conductors passing through a wall of the housing. In one construction, the sleeve has axially extending corrugations which allow for its expansion and collapse.

10 Claims, 9 Drawing Figures

ENTRANCE TERMINALS FOR TELECOMMUNICATIONS CABLE

This invention relates to an entrance terminal for a telecommunications cable.

Where a telecommunications cable enters a central office or switching center, or other premises such as customers' premises, it is normal practice to splice one end of a stub cable onto the end of the incoming cable and the conductors at the other end of the stub cable are connected to conductor terminals in an entrance terminal. The conductors of the stub cable are of smaller diameter than the conductors of the incoming cable so that the stub cable conductors act as fuse links, whereby they fuse if an overload is applied to the conductors of the cable. An overload condition exists, for instance, when high voltage power lines contact the telecommunications cable.

A problem which exists with the use of external fuse links, however, is that combustion of any link may occur during overload conditions and any fire caused by fusing of a link easily spreads to the remainder of the stub cable and to other cables and to the property itself. This may result in changing of the complete terminal.

The present invention is concerned with improvements to an entrance terminal housing and to an entrance terminal in which thereby is a higher level of containment of flames than has previously been possible.

According to one aspect of the present invention, an entrance terminal housing is provided comprising walls which define a chamber, the walls sealingly joined together and between them defining an opening to the chamber, at least one of the walls defining at least one aperture for passage of conductors of a cable through the wall; a cover for removably closing the opening and a sealing means to provide a seal between the walls and the cover when the opening is closed; and a plurality of positions each for holding a terminal connector to electrically connect terminals of an incoming cable with another cable, a plurality of individual covers provided for covering each of said positions or groups of said positions so as to isolate individual connectors or groups of connectors from one another.

With the above construction according to the invention, because the walls of the housing are sealed together then they provide no gap between them for the spread of flame or fire from the chamber. Furthermore, a seal is also provided between the cover and the walls of the housing for the same reason. The aperture which is provided for the passage of the cable conductors is the only location at which fire or flame spread could occur. However, a fire resistant conductor sleeve may be provided and which acts as a substantial fire barrier at the location of the aperture.

Another problem which exists is the forming of an effective flame and fire barrier between two spaced terminal housings of an entrance terminal assembly in which conductors of a cable extend from one housing to the other. The present invention provides a fire resistant cable sleeve which successfully overcomes this problem and may be used around a range of quantities of conductors extending from terminal to terminal.

According to a further aspect of the present invention therefore, there is provided a fire resistant conductor sleeve for forming a substantial fire resistant coupling between entrance terminals for cable, the sleeve formed from a flexible fire resistant material and being of tubular form with a radially expansible and collapsible tapered axially extending section having a plurality of circumferentially spaced and axially extending corrugations, radial expansion of the tapered section opening the corrugations around the sleeve and radial collapse accompanied by collapse of the corrugations, and a sealing section at the larger diameter end of the tapered section, the sealing section comprising two axially spaced-apart seals each formed by at least one flange for sealing against a surface of a terminal housing.

With the use of the above inventive sleeve, because the tapered section is expansible and collapsible, it is readily shaped to conform closely to the number of cable conductors between certain limits. Preferably, the tapered section has a plurality of circumferentially spaced and axially extending corrugations, the smaller diameter end of the tapered section may be caused to expand by flattening of corrugations to allow for the conductors to pass through it. A clip passed around the tapered section secures it tightly to the conductors effectively collapsing the region of the cable beneath the clip. Any gaps remaining are too small to permit passage of fire or flames therethrough and from one housing to the other.

As yet a further feature of the present invention, there is provided a housing assembly for an entrance terminal assembly comprising at least two housings for conductors, at least one being an entrance terminal housing having a plurality of positions each for holding a terminal connector to electrically connect terminals of an incoming cable with another cable, a plurality of individual covers provided for covering each of said positions or groups of said positions so as to isolate individual connectors or groups of connectors from one another, each housing having walls which define a chamber with the walls sealingly joined together and between them defining an opening to the chamber, each housing also comprising a cover for removably closing the opening and a sealing means to provide a seal between the walls and the cover when the opening is closed, a wall of each housing also defining an aperture for passage of conductors of a cable through the wall, the two apertures being aligned and the assembly also comprising a fire resistant conductor sleeve for location between the terminals and through the apertures for forming a substantial fire barrier between housing, the sleeve formed from a flexible fire resistant material and being of tubular form with a radially expansible and collapsible tapered axially extending section and a sealing section at the larger diameter end of the tapered section, the sealing section comprising two axially spaced-apart seals, one for each housing, each seal formed by at least one flange for sealing against a part of the wall surrounding the aperture of the associated housing, at least one of said housings having a wall defining another aperture for passage of conductors of a cable through the wall into the chamber of said at least one housing.

Thus as can be seen from the above housing assembly according to the invention, the sleeve not only effectively prevents flames and combustion from spreading within a particular housing and into the ambient atmosphere, it also prevents spread from one housing to the other along the conductors extending between the housing.

Embodiments of the invention will now be described by way of example, with reference to the accompanying drawings in which:

FIG. 1 relates to a first embodiment and is an isometric view of an entrance terminal in an open condition and with an incoming cable connected;

Figure 1:
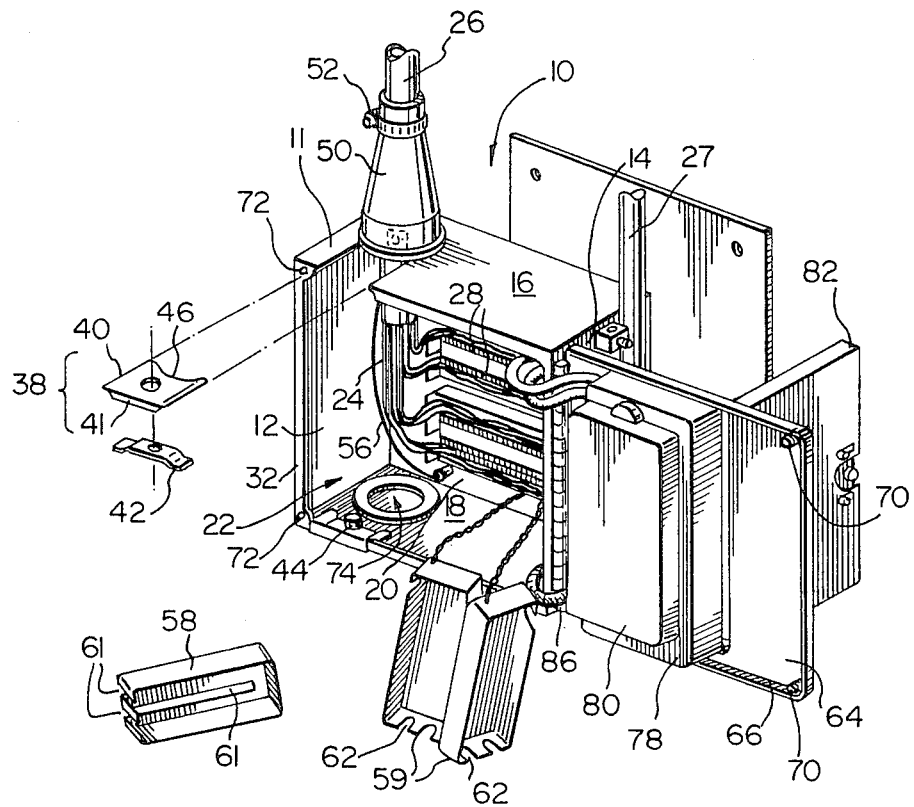
Figure 4:
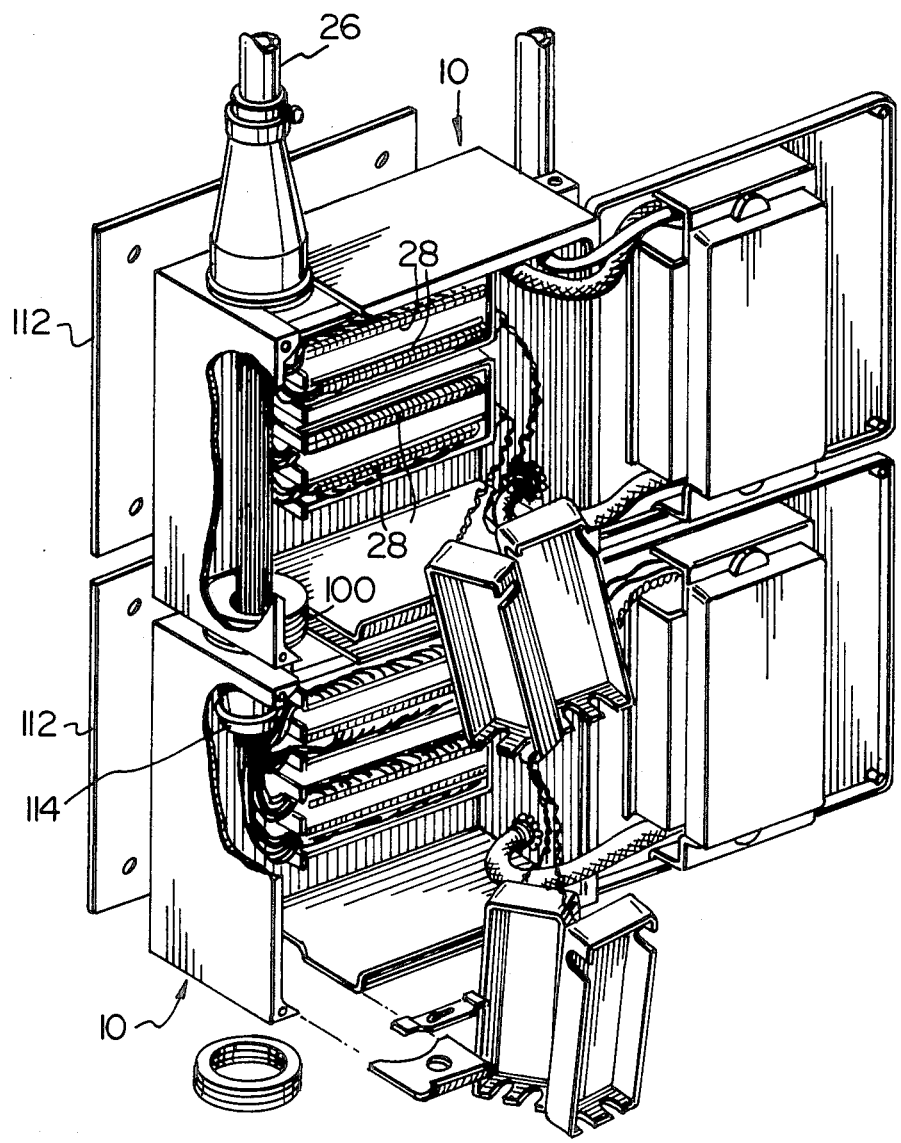
Figure 5:
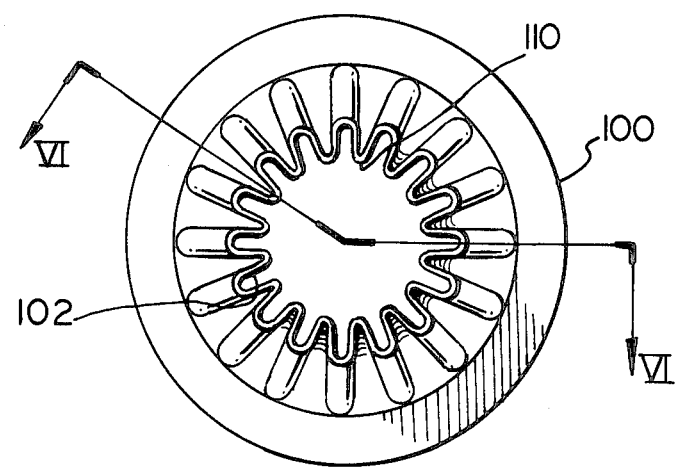
Figure 6:
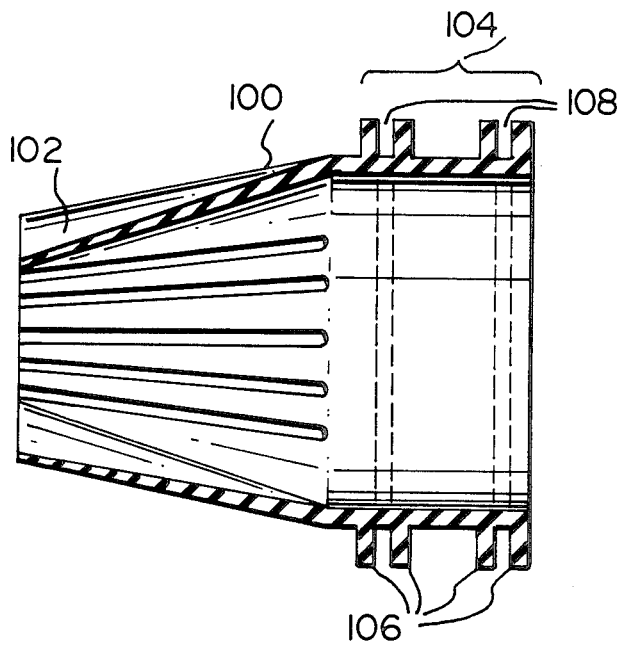
Figure 7:
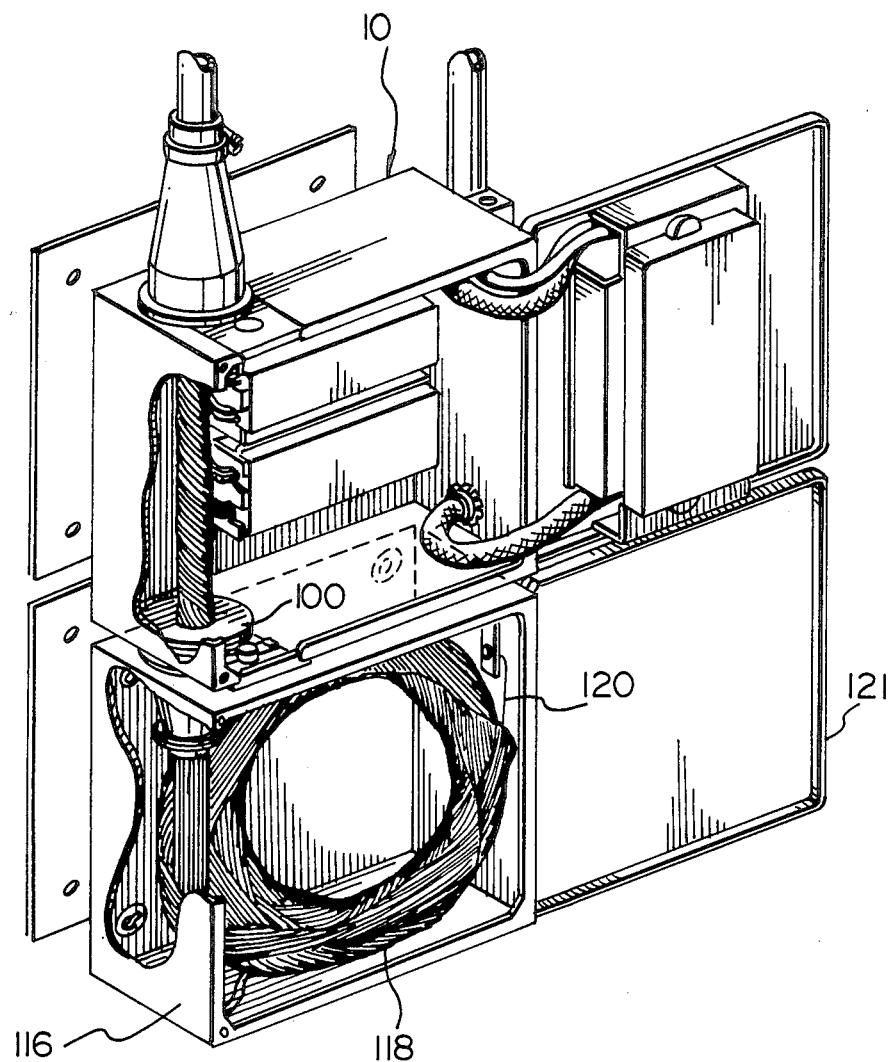
Figure 8:
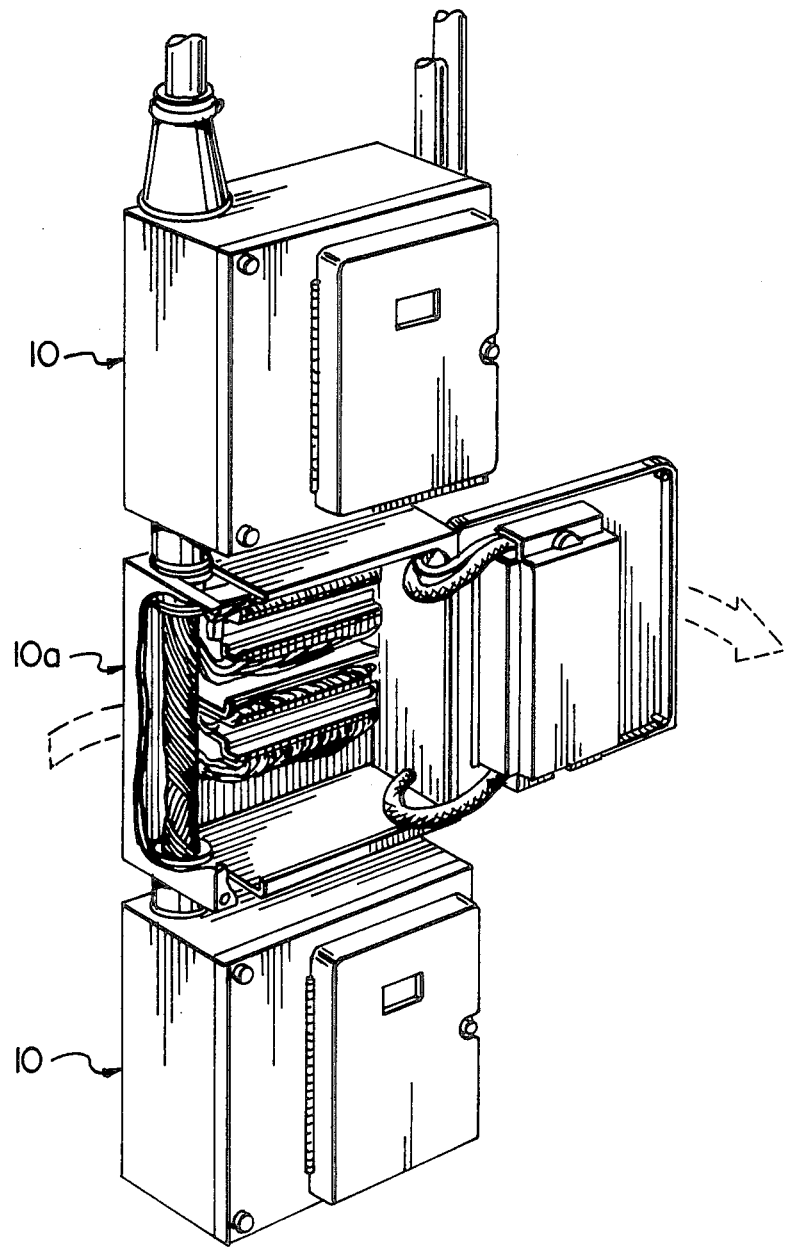
Figure 9:
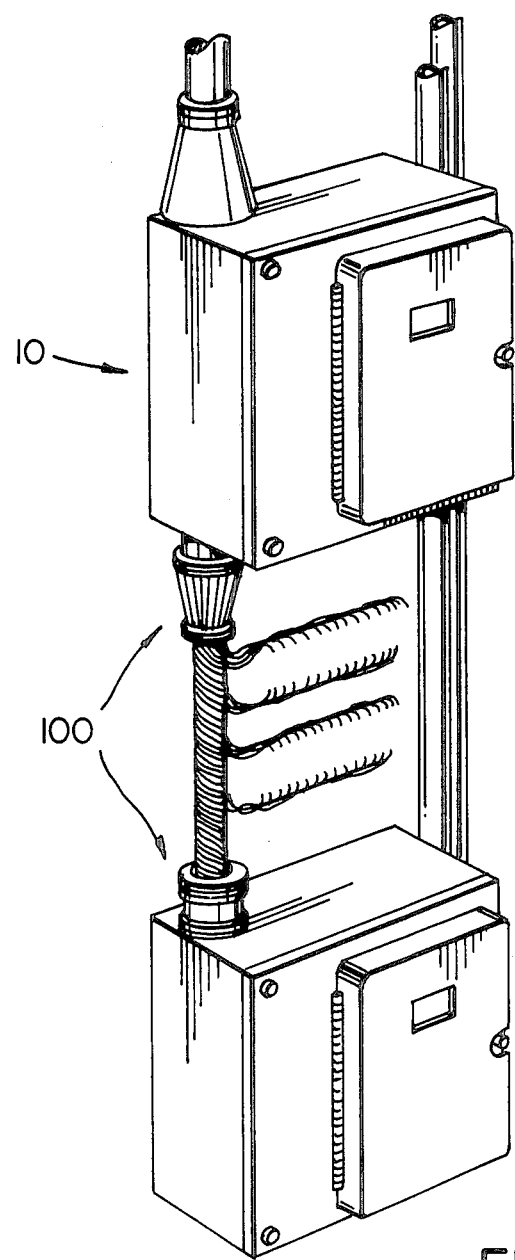

FIG. 4 relates to a second embodiment and is an isometric view of an entrance terminal assembly showing two terminals with an incoming cable connected;

FIG. 5 is an end view through a conductor sleeve used in the assembly in FIG. 4 and acting as a fire resistant coupling between terminals;

FIG. 6 is a cross-sectional view taken along the line VI—VI in FIG. 5;

FIG. 7 is a modification of the second embodiment and is an isometric view of an entrance terminal assembly in which one of the housings is a housing for containing the end of a cable length; and FIGS. 8 and 9 show a method of placement of a housing as shown in FIG. 1, in between housings already connected into a cable.

In the first embodiment shown in FIGS. 1 and 2, a terminal housing 10 for an entrance terminal assembly such as will be described, comprises a sheet metal box 11 having two side walls 12 and 14 and a top 16 and bottom walls 18, folded at 90° to a base 20 so that edges of the walls lie adjacent to each other. The sides, top and bottom walls are sealingly joined by a welding or soldering process. The housing defines a chamber 22 for conductors 24 of an incoming cable 26 to be connected into terminal connectors 28 which form part of electrical connections to an inside cable 27 as will be described.

Each of the top and bottom walls are formed with an aperture 30 (FIG. 2) for passage of conductors of the cable through the walls so as to enable the conductors to be connected to connector terminals of the connectors.

At a position remote from the base 20, each of the walls 12, 14, 16 and 18 is formed with an inwardly directed edge flange 32 which surrounds an opening 34 to the chamber formed by the wall flanges. This opening, as can be seen, substantially occupies the area of a whole omitted side to the housing. Each aperture 30 is connected to the opening 34 by a straight-sided slot 36 the width of which is such as to accept the cable 26 or the bunched conductors 24 of the cable as they are moved along the slot from the opening 34 into the aperture 30. A slot closure 38 is used for closing each of the slots 36 when a cable or its conductors are in a position passing through the associated aperture 30. This slot closure comprises a closure plate 40 which is of width sufficient to overlap the outer surface of the top or bottom walls to which it may be fitted. The plate 40 also has an edge flange 41 to bridge the gap across flanges 32 at the slot 36 (see connection to wall 18 in FIGS. 1 and 2). The closure also includes a securing plate 42 which is to be disposed on the inside of the housing as shown by FIGS. 1 and 2, a nut and bolt assembly 44 being used to lock the two plates together by passage through holes in the plate. The cover plate 40, as shown clearly in FIG. 2, has one edge 46 which is concave and when in the position of covering the slot this concave edge 46 completes the substantially circular configuration of its associated aperture 30.

Within the housing are provided a plurality of positions for holding the terminal connectors 28 within the housing. The terminal connectors 28 shown in the Figures are those normally referred to as cross-connect connectors each of which comprises a body of dielectric material and having a row 29 (FIG. 3) of conductor terminals along each side. Terminals in one row are interconnected through the dielectric material with terminals in the other row to enable the conductors of the two cables to be interconnected. Both the connectors and their method of mounting in their positions are well known in the art and need not be described.

As shown by FIG. 1, the cable 26 entering through the top wall 16, is secured to the top wall by a tapered rubber cable sleeve 50 which is secured to the cable by a clip 52 and has a pair of sealing flanges 54 defining an orifice into which the part of the wall 16 surrounding the orifice 30 enters. The cable is grounded by a conventional grounding wire 56 which is secured to the base wall 20 of the housing. Conductors of the cable are connected to each of the terminals in the cross-connect connectors 28 as shown by FIG. 1. A plurality of individual covers 58 and 59 are used for groups of connectors, there being two connectors to each group. Thus with four connectors, two covers 58 and two covers 59 are provided. The covers 58 are inner covers (one only shown in FIG. 1) and are formed with slots 61 to enable the outer row of terminals 29 (FIG. 3) connected to the conductors 24 to pass through the slots with the covers in position. The covers 58 are merely pressed into position between flanges 63 of the housing close to the connector bodies thereby providing a flame combustion barrier from one row of terminals to the other. The covers 59 fit over covers 58 and over flanges 63 so as to isolate the outer row of terminals from the remainder of chamber 22. In the assembled position, the covers are as shown in FIGS. 2 and 3. Covers 59 are freely movable upon the ends of wires 60 secured to the inside of the housing, whereas covers 58 are completely detachable. Each cover 59 is provided with slots 62 for the passage of the conductors from the cable 26 to the terminals of the connectors.

The opening 34 to the housing is covered and sealed in use by a cover or door 64 which is hinged to the side wall 14. This door has a continuous outer flange 66 which, when the door is in a closed position, extends around and overlaps the walls of the housing for a short distance along the walls from the flanges 32. Upon the inner face of the door, there is secured a sealing means in the form of an annular length of a compressible rubber strip 68 part of which is shown in FIG. 2. With the door in its closed position and held tightly to the flanges by securing bolts 70 mounted at two corners of the door and received in screw-threaded holes 72 in the flanges, then an effective seal is formed between the door and the housing.

It follows that with the cable in position and the door closed, then should there be any combustion at any terminal beneath either of the covers 58 and 59, then this will be prevented from spreading to the terminals below the other cover. Also any fire which commences within the housing generally and not contained by the covers 58 is prevented from escaping outwards from the housing by the joints between the walls of the container and the seals between the walls and the door and between the walls and the cable sleeve 50, the two slots 36 previously having been sealed with the cover plates 40. In the embodiment shown in FIGS. 1 and 2, the aperture 30 in the bottom wall 18 is not used for passage of cable and this aperture is sealed by a cover plate 74. It follows, therefore, that the whole of the inside of the housing is sealed from ambient atmosphere and thus efectively minimizes or prevents the spread of fire or flame outwardly from the housing.

A protector module block 78 is secured to the inside of the door 64 and this block has a cover plate 80 as shown by the Figures. On the outside of the door 64 is hinged a smaller door 82 which is used to reach the inside of the protector block 78 with the door 64 in a closed position.

Fuse link conductors are connected to the rear terminals of the cross-connect connectors 28. These fuse link conductors are bunched together into a conductor group 84 which are brought out from behind the covers 58 and extend forwardly to be connected to terminals in the protector block. The fuse link conductors are surrounded by a sleeve of heat or flame resistant material and in this particular case this material is a fiberglass material which is wrapped around the group of conductors. Thus, if one of the fuse link conductors were to fuse under overload conditions then any combustion which commenced in the fuse link group would be contained therein by the fiberglass sleeve. Outgoing conductors 86 from the module 78 connect the terminals within the module with the outgoing cable 27. Also provided from the module 78 is a ground connection 90.

FIGS. 4, 5 and 6 illustrate a second embodiment. The second embodiment as shown in FIG. 4 relates to an entrance terminal assembly and concerns the incorporation of two housing terminals together, each housing terminal 10 being of the construction described in the first embodiment.

As shown by FIG. 4, the two housings are disposed one above the other and an incoming cable 26 is held into the upper housing with its conductors passing through the upper aperture 30 in the manner discussed in the first embodiment. However, in the second embodiment, some of the conductors are joined to terminals of connectors 28 of the upper housing and other conductors 26 proceed through the lower aperture 30 of the upper housing and the upper aperture of the lower housing, the apertures being aligned for this purpose. The conductors 26 proceeding into the lower housing are then joined to terminals of connectors 28 in the lower housing.

As described with regard to the first embodiment, the housing 10 is completely combustion and flameproof with the door 64 closed. In the second embodiment however, with the doors 64 closed, then to achieve the combustion and flameproof requirement a special sealing arrangement is necessary and which extends between and provides a fire resistant coupling between the two housings. This special sealing arrangement is in the form of a fire resistant conductor sleeve 100 which lies between the two containers. As shown particularly in FIGS. 5 and 6 the sleeve 100 is formed from a flexible fire resistant material such as soft neoprene rubber and is generally of tubular form. The sleeve comprises a radially expansible and collapsible tapered axially extending section 102 and a sealing section 104 at the larger diameter end of the section 102. The sealing ssection comprises two axially spaced-apart seals, each seal comprising two axially spaced annular flanges 106. The flanges 106 of each seal define between them an annular groove 108 which is of sufficient width to accept the thickness of the part of the wall of one of the housings surrounding an aperture 30, the two flanges then lying at each side of the wall and in sealing engagement with it. Thus to enable the lower wall 18 of the upper housing and the top wall of the lower housing to be accepted within the respective grooves 108, then the two housings must be positioned a fixed distance apart.

The tapered section 102 of the sleeve is of corrugated form in a section normal to the main axis of the sleeve with the corrugations 110 extending in an axial direction and being relatively positioned circumferentially of the sleeve.

When the two housings are disposed in their desired positions on a wall, as upon holding plates 112, then to connect the conductors to respective terminals 29, the sleeve 54 is placed onto the cable followed by the sleeve 100 and then both sleeves are slid along their respective slots 36 until they are positioned accurately in the apertures 30. In this position, as shown in FIG. 4, each flange 106 of the sleeve 100 is sealed against the wall of its respective housing with the wall located in the groove 108 as described. The tapered section 102 is then secured to the conductors which pass through into the lower housing 110. This procedure is performed with the use of a binding member 114 (FIG. 4) which is secured tightly around the tapered section. Upon the binder being positioned around the cable sleeve, the sleeve is drawn onto the conductors by being radially collapsed by the binder and the corrugations collapse so that any gaps around the conductors are substantially closed by the collapsing corrugations. The tapered section is also capable of expanding because of the corrugations, to accommodate larger numbers of conductors. Thus the sleeve is easily used for any number of conductors which are intended to pass through it within certain limits. The use of this particular sleeve therefore, avoids the necessity of using different sizes of sleeves for different numbers of conductors in different groups.

Figure 2:
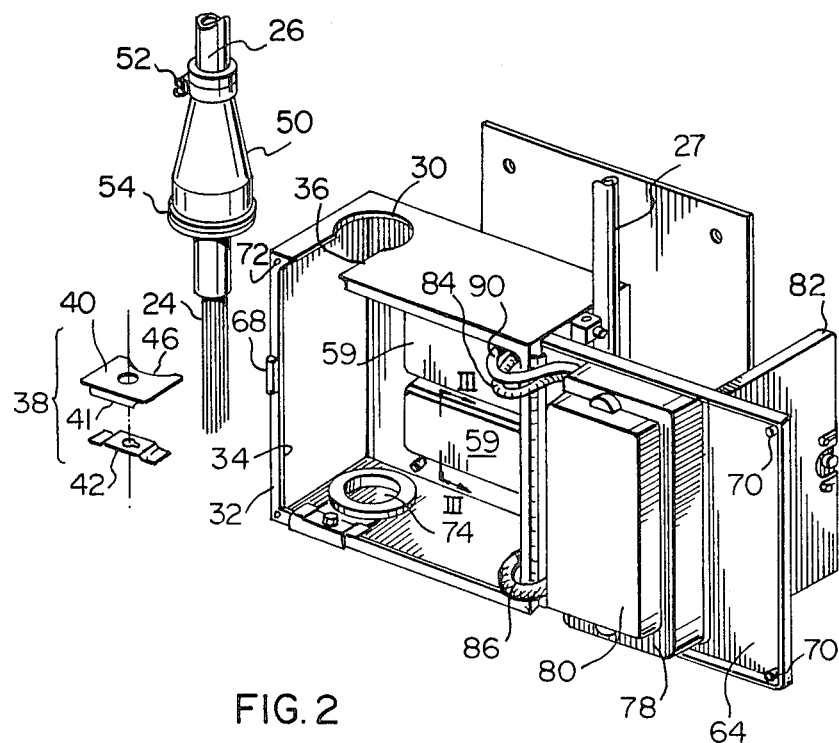
FIG. 2 is a view of the terminal similar to FIG. 1 but with the cable removed and other parts of the terminal rearranged.
Figure 3:
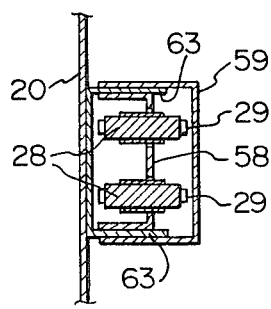
FIG. 3 is a cross-sectional view taken along line III—III in FIG. 2 and on a larger scale.

The assembly shown in the second embodiment is completed by placing the covers 58 and 59 in position (such as shown in FIGS. 2 and 3) and also by locating the closure plate 40 and securing plate 42 into the slots 36 in each case in each of the housings. In FIG. 3 only one closure plate 40 and securing plate 42 is shown.

In a modification of the second embodiment as shown in FIG. 7, the construction is similar to that described with regard to FIG. 4 except that a lower housing 116 is not an entrance terminal housing, but instead is a similarly shaped housing which is completely empty of terminal positions and connectors 28. Also, the protector module 78 is omitted. The housing 116 is used merely for the purpose of accommodating the ends of conductors 118 which have not been used for connection to terminals in the other housing. Thus, these conductors 118 extend through one of the sleeves 100 of the construction described above, into the housing 116 and the conductors remain in coiled fashion within the housing for future use. The conductors are grounded by a grounding wire 120 to a side of the casing. The structure of the housing 116 has a door 121 which also seals against the walls of the housing in a manner similar to that of housing 10. In this modification of course, the sleeve 100 would prevent any combustion or flame spread from the housing 10 to housing 116.

The housings described above may be used together in any number in an entrance terminal assembly. It may be necessary to install or replace a housing and this procedure could normally necessitate dismantling other housings and disconnecting the conductors so that the particular housing under consideration is replaced. However with the structure of the housing 10 described, it is possible to replace a housing which lies in between ends of the row of housings in the assembly. This is made possible by the use of the apertures 30 together with the slots 36 which open into the openings 34 of the housings. It follows that, with reference to FIGS. 8 and 9, if the housing 10a lying between two housings 10 is to be removed, then it is merely necessary to disconnect the conductors to the terminals in that housing and then to remove the closure plate 40 in each of the slots 36 of that particular housing. The outgoing cable 122 is also disconnected from its outlet from the housing. The housing shown in FIG. 8 is then merely rotated out of the plane of the other housings, as shown by the dotted arrow, about the axis of the two apertures 30 until the housing lies outwardly from the plane of the drawing and in a new position at approximately 90° to that shown. In this position the housing is moved sideways so that the slots 36 move along the conductors and the housing becomes free. After removal of the housing the position of the conductor ends between the other housings is as shown in FIG. 9. It is then a simple matter to insert a new housing (not shown) by following the reverse procedure, i.e. locating the cable into the slots 36 and into the aperture 30 with the new housing at 90° to the position shown in FIG. 8 and then rotating the housing into the plane of the figure. The assembly is then completed using the closures 38.

What is claimed is:

1. An entrance terminal housing comprising: walls which define a chamber, the walls sealingly joined together and between them defining an opening to the chamber, at least one of the walls defining at least one aperture for passage of conductors of a cable through the wall; a cover for removably closing the opening and a sealing means to provide a seal between the walls and the cover when the opening is closed; and a plurality of positions each for holding a terminal connector to electrically connect terminals of an incoming cable with another cable, a plurality of individual covers provided for covering each of said positions or groups of said positions so as to isolate individual connectors or groups of connectors from one another.

2. A housing according to claim 1, wherein the or each aperture for conductors is joined to the opening by a slot to allow for lateral sliding movement of conductors into and out of the aperture and the housing has a slot closure to close the slot and assist in defining the aperture, and the sealing means also provides a seal between the slot closure and the cover when the cover closes the opening.

3. A terminal according to claim 1, wherein the walls are formed from sheet metal and around the opening, are formed with flanges to provide surfaces for engagement by the sealing means which is sandwiched between the flange and the cover in the closed position of the cover and the cover has an edge flange which extends around the walls in said closed position.

4. A terminal according to claim 1, having a protector module cover which is detachably mountable in the housing to surround a location for a protector module.

5. A fire resistant conductor sleeve for forming a substantial fire resistant coupling between entrance terminals for cable, the sleeve formed from a flexible fire resistant material and being of tubular form with a radially expansible and collapsible tapered axially extending section having a plurality of circumferentially spaced and axially extending corrugations, radial expansion of the tapered section opening the corrugations around the sleeve and radial collapse accompanied by collapse of the corrugations, and a sealing section at the larger diameter end of the tapered section, the sealing section comprising two axially spaced-apart seals each formed by at least one flange for sealing against a surface of a terminal housing.

6. A sleeve according to claim 5, wherein each seal comprises two axially spaced annular flanges which between them define an annular groove for acceptance of the wall of a terminal housing.

7. A housing assembly for an entrance terminal assembly comprising at least two housings for conductors, at least one being an entrance terminal housing having a plurality of positions each for holding a terminal connector to electrically connect terminals of an incoming cable with another cable, a plurality of individual covers provided for covering each of said positions or groups of said positions so as to isolate individual connectors or groups of connectors from one another, each housing having walls which define a chamber with the walls sealingly joined together and between them defining an opening to the chamber, each housing also comprising a cover for removably closing the opening and a sealing means to provide a seal between the walls and cover when the opening is closed, a wall of each housing also defining an aperture for passage of conductors of a cable through the wall, the two apertures being aligned and the assembly also comprising a fire resistant conductor sleeve for location between the terminals and through the apertures for forming a substantial fire barrier between housings, the sleeve formed from a flexible fire resistant material and being of tubular form with a radially expansible and collapsible tapered axially extending section and a sealing section at the larger diameter end of the tapered section, the sealing section comprising two axially spaced-apart seals, one for each housing, each sealed formed by at least one flange for sealing against a part of the wall surrounding the aperture of the associated housing, at least one of said housings having a wall defining another aperture for passage of conductors of a cable through the wall into the chamber of said at least one housing.

8. An assembly according to claim 7, wherein each seal comprises two axially spaced annular flanges which between them define an annular groove for acceptance of the part of the wall which surrounds the aperture of the associated terminal.

9. An assembly according to claim 7, wherein both housings are entrance terminal housings.

10. An assembly according to claim 7, wherein one of the housings is to contain conductor lengths which are unconnected to terminals in the terminal housing or housings.

* * * * *